Nov. 22, 1949 — P. A. CARULLO ET AL — 2,488,848

DOUBLE ROW BEARING

Filed June 9, 1948

Inventors
PAUL A. CARULLO AND
EDMUND K. BROWN

By Mason, Porter, Diller & Stewart,
Attorneys

Patented Nov. 22, 1949

2,488,848

UNITED STATES PATENT OFFICE 2,488,848

DOUBLE ROW BEARING

Paul Anthony Carullo and Edmund Karl Brown, Torrington, Conn., assignors to The Torrington Company, Torrington, Conn., a corporation of Maine Application June 9, 1948, Serial No. 31,886

4 Claims. (Cl. 308—212)

This invention relates to a roller bearing in which an outer member is provided at its ends with radially inturned and curled flanges. The individual rollers have reduced ends that are to be received and held against separation, so that the assembly of outer member and rollers provides a unit.

One of the features of the invention is the provision of a unitary bearing structure having a one-piece outer member with a double row of rollers located therein, and with these rollers held against separation from this one-piece outer member.

Another feature of the invention is the provision of a roller bearing structure in which the axial length of the assembly, and the presence therein of the double row of bearing members, permit increase in the allowable load for the given axial length of the assembly, as compared with the use of two separate roller bearings of standard type within the same axial space.

Another feature of the invention is the provision of a roller bearing unit in which the outer race member and its curled end flanges and lips are completely hardened to the maximum strength of the material, and can be subjected to full inspection prior to the introduction of rollers thereto.

A further feature is the provision of a method of forming a roller bearing, by completing the forming, and the hardening treatment if used, of a race member, before assembling bearing rollers therein in making the bearing unit.

With these and other features as objects in view, as will appear in the course of the following description and claims, an illustrative form of practice is shown on the accompanying drawings, in which:

This illustrative form shows a needle bearing, that is, a bearing having a full peripheral complement of rollers so that a separator is not necessary to maintain the peripheral spacing. In the absence of such a separator, and of the possibility of using it to prevent accidental disassembly, it is of particular value to have a structure which is capable of handling as a unit.

Figure 1:
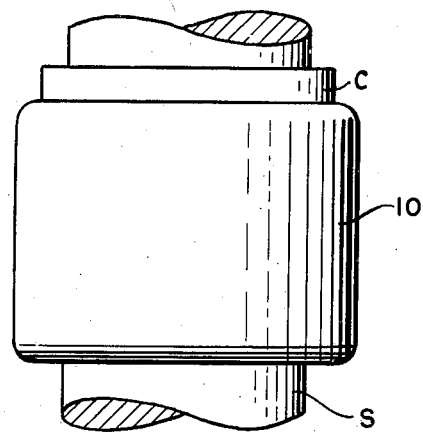
Fig. 1 is an external view of a bearing according to this invention.
Figure 2:
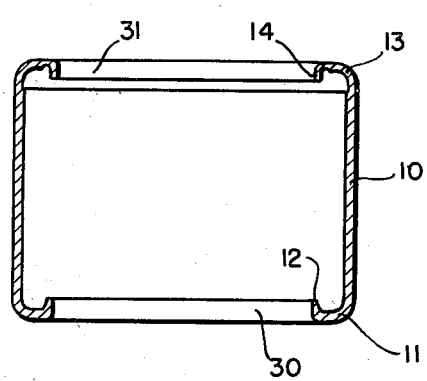
Fig. 2 is a view, in diametrical section, showing an outer race member formed and ready to be loaded with rollers.

The outer race member of Fig. 2 may be made and formed as shown in the Brown Patent No. 2,038,475, except that both flange ends are brought to final shape before the insertion of rollers. Such an outer race member has a cylindrical race portion 10, a first end flange 11 provided with an inturned lip 12; and a second flange 13 provided with an inturned lip 14. In the illustrated form, both of the end flanges have concentric apertures 30, 31, so that the structure may be inserted upon a shaft, by introduction at either end thereof.

Figure 4:
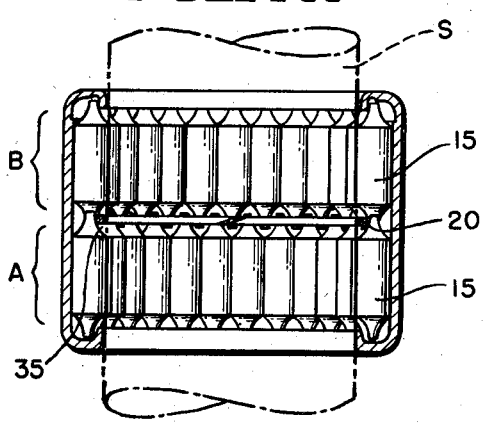
Fig. 4 is a corresponding view, with a split ring in position, a shaft being shown in dotted lines for clearer disclosure of the rows of rollers.
Figure 5:
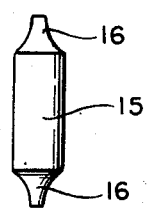
Fig. 5 is a side view of a bearing roller.

A plurality of bearing rollers 15 (Fig. 5) are employed within this structure, being arranged in the two rows A, B, as indicated in Fig. 4. Each individual roller 15 has its ends 16 reduced in size. In the illustrated form, each reduced end has a surface of revolution about the roller axis, with a section curving concavely from the cylindrical bearing surface of the roller toward the extreme end, and with the shape approaching a cylinder at such extreme end: and can be referred to as having a curvilinear taper. It is preferred to have all rollers identical in shape and size, to facilitate assembly.

By construction, the surface of the hole 30 or 31 provided in each end flange, being the radially inward surface of the lips 12, 14, is made larger than the shaft or internal bearing member S upon which the device is to work as indicated by the showing of the shaft S in dotted lines in Fig. 4. The diameters of the rollers and of the inner surface of the race portion 10 of the outer member are so related to the diameter of this internal shaft or other member, that a rolling fit of the parts is assured, and the lips 12, 14 are held away from contact with the said shaft. Correspondingly, the reduced ends 16 of the rollers can fit within the lips 12, 14, that is, within the annular channel or trough space provided between these lips and the ends of the race portion 10, without restriction upon the rolling of the individual rollers 15 between the internal shaft member and the inner surface of the race member 10. The individual rollers 15 are slightly longer over-all than one-half the distance between the flanges 11, 13, and with their cylindrical portions slightly less than one-half the distance between the lips 12, 14; and the rollers are staggered or overlapped, as shown in Fig. 4, at the adjacent reduced ends thereof. As shown in the figures, the present preference is to have the adjacent ends overlap for about one-half their respective axial lengths, so that the axial length of the groove formed at the overlapping ends is about half again as wide as the axial length of one such end: wherewith the retainer ring described hereinafter can exert a slight endwise thrust upon the rollers of the rows.

A split retainer ring 20 is provided of spring material, such as the spring steel or spring brass, having an internal diameter greater than the outer diameter of the shaft S, and having an external diameter closely fitting the inwardly open groove 35 with inclined walls formed and existing between the adjacent or inner ends of the two rows of rollers 15 (Fig. 4). In present practice, spring wire is coiled into a helix, with the outer diameter of the helix greater than the diametral distance from groove surface to groove surface, so that the inserted ring bears with an outward spring action or tension against the reduced ends of the rollers. The turns can be cut at an angle; and in general it is preferred that the gap, if any, of the inserted ring shall be less than the diameters of the contacted parts of the reduced roller ends.

The preferred manner of manufacture of such a bearing is to make the outer member with its race portion 10, flanges 11, 13, and the lips 12, 14 as a unit, before inserting the rollers therein. This may, for example, be done, as described in the aforesaid Brown patent, by making a cup from sheet metal, by the usual drawing and cupping operations, cutting a circle from the bottom of the cup to leave the lip 12 as shown in Fig. 2; and then completing the flange 13 and the lip 14. These operations can be accomplished upon annealed material, and with intermediate or process annealings as necessary. When the cup and outer member formed therefrom are completed, the piece can then be hardened and tempered as desired, to obtain a maximum of strength and of the influences opeating upon it during service. It can be tumbled or otherwise treated to remove any dark oxide formed during the tempering and hardening operations. It will be noted that this completed outer member is clear for inspection even after the final hardening and polishing: and hence defects apparent only at inner surfaces of the flanges, for example, can be found and such pieces rejected.

The rollers 15 can be made by cutting, grinding or otherwise machining, hardening, and finish grinding or polishing.

Figure 3:
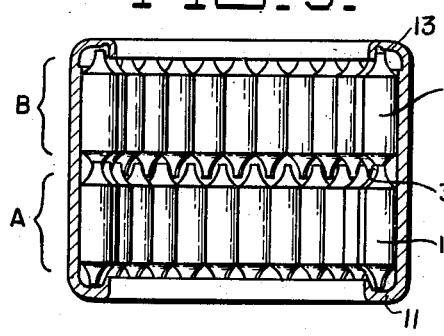
Fig. 3 is a corresponding view, with two rows of rollers in position.

The assembly of the unit bearing can be accomplished by placing it with the flange 11, for example, upon a table, and then inserting a first row of rollers, the row A in this illustrative example, with their lower reduced ends 16 engaged within the annular trough provided by the lip 12. The second row of rollers B can then be introduced, with the reduced inner or middle ends of the two rows of rollers alternating or interlocking with one another, as shown in Figs. 3 and 4, to provide the groove 35. It is customary to introduce a lubricant during the assembly, and this lubricant serves also the purpose of holding the rollers against falling out of their particular position, during this intermediate stage, even without the employment of a central plug or other locating device.

The split retainer ring 20 is collapsed in diameter sufficiently to pass within the inner parts of the surfaces of the rollers 15, and is pushed axially until it snaps into the groove 35 provided at the middle of the bearing assembly, where the adjacent ends of the two rows of rollers overlap. Alternatively, the ring 20 can be inserted before the second row B of rollers are introduced, and employed to hold the first row A in position: when the second row B is in place, the ring 20 is slid axially until it slips into the groove 35. The assembly is now completed, and the unit can be employed without danger of the rollers falling out during any normal handling of the device or during its service.

Figure 6:
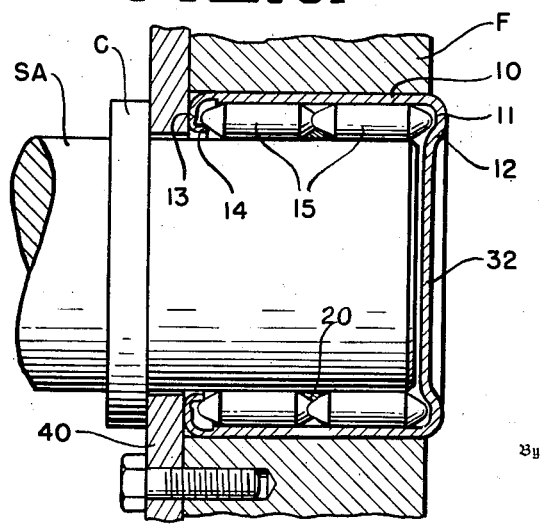
Fig. 6 shows a modified form.

Fig. 6 corresponds to Fig. 4, but shows a "blind end" structure, having the outer member formed from a cup as before, but with its lower end left uncut and hence having a closing wall 32, merging with the lip 12, which prevents entry of dust at this point. The shaft SA can, for example, be supported against endwise movement by a separate thrust-plate 40, carried by the frame F into which the bearing unit has been pressed and receiving a collar C on the shaft.

In practical use, it has been found that there is about a seventy percent increase in the load-carrying capacity, for a given total length, to the advantage of the present double-row bearing over employment of two separate needle bearings fitted within the same axial distance.

The employment of completely hardened and carefully inspected lips, with the present device, assures ample strength to prevent any destructive axial pushing out of the lips when high end thrust is developed by the rollers.

Further, in practice, the instant double row bearing better provides for shaft misalignment over the previous employment of two separate bearing shells. Thus, the present structure as a single unit with corresponding ease of insertion, has advantage over prior practices of employing two regular, single-row needle bearings with allowance or tolerance to take care of possible misalignment of the shaft with respect to the hole for receiving the unit shells.

The instant arrangement, with two separate rows of rollers, results in a longer life, and with avoidance of complete bearing failures for a longer time; because if a failure occurs over the full axial length of one of the paths for roller row A or B, the disintegration or spalling of the shell does not extend axially past the unloaded center section of the shell, and hence one of the rows of bearings will still be exerting antifriction effects.

It is obvious that the invention is not limited solely to the form and construction illustrated.

What is claimed is:

1. A roller bearing unit comprising an outer race member having radially inturned flanges at its ends and having axially inturned lips on said flanges to provide peripheral troughs, a plurality of rows of rollers with each roller having reduced ends, said reduced ends at the ends of the bearing unit being engaged in said troughs, the said reduced ends of one row and spaced from the ends of the bearing unit being in overlapping relation and staggered relative to the adjacent reduced ends of the rollers of the next row, said overlapping reduced ends providing an inwardly open peripheral groove, and a split ring of spring material engaged in said groove and effective to prevent accidental disassembly of the unit.

2. A roller bearing unit comprising an outer race member having inturned flanges and lips to provide peripheral troughs at its ends, two rows of rollers with each roller having tapered reduced ends, said reduced ends at the ends of the bearing unit being engaged in said troughs, the other said reduced ends of the rows of rollers being in overlapping and staggered relation to one another and thereby forming an inwardly open groove with inclined walls, and a split ring of spring material located within said groove and bearing against said inclined walls and exerting outward and axial pressure thereagainst.

3. A needle bearing unit comprising an outer race member having a cylindrical inner surface, axially inturned flanges at its ends, and axially inturned lips on said flanges, whereby to provide peripheral troughs; two rows of rollers with cylindrical bodies engaged with the said cylindrical inner surface, and having curvilinearly tapered reduced ends, the inner ends of the rollers of each row being in overlapping and staggered relation to those of the other row, whereby to provide an inwardly open groove, the outer ends of the rollers of each row being engaged in one of said troughs; and a split ring of spring material located in said groove and effective to prevent disassembling endwise movement of said rollers.

4. A needle bearing as in claim 3, in which the lip at one end merges into a wall closing said end.

PAUL ANTHONY CARULLO.
EDMUND KARL BROWN.

REFERENCES CITED

The following references are of record in the file of this patent:

UNITED STATES PATENTS

| Number | Name | Date |
| --- | --- | --- |
| 2,038,475 | Brown | Apr. 21, 1936 |
| 2,065,311 | Hoke | Dec. 22, 1936 |